2 Sheets--Sheet 2.
J. R. & J. S. BALL & J. G. MOLE.
Corn-Planters.
No. 155,484. Patented Sept. 29, 1874.
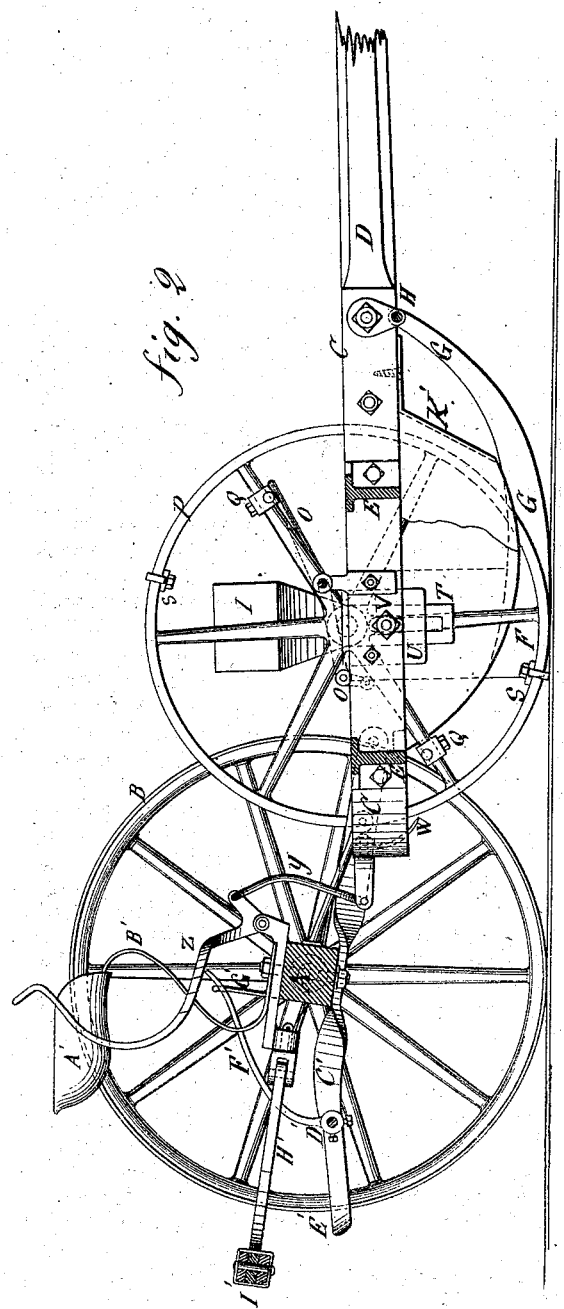
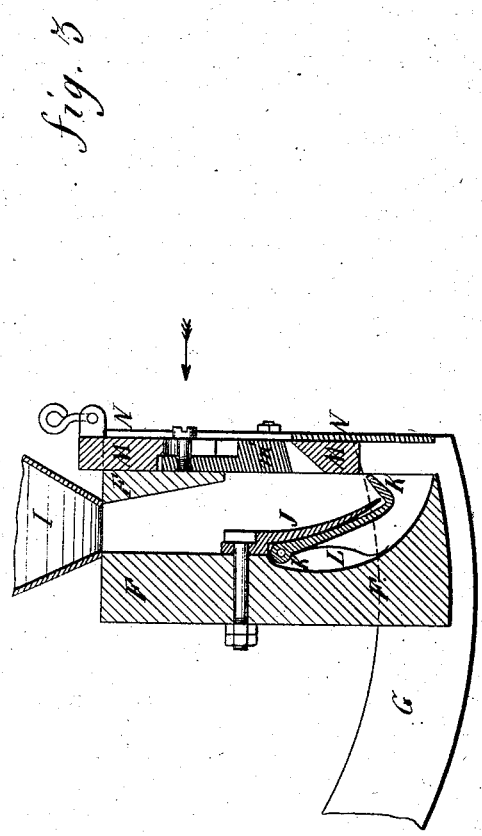
WITNESSES:
INVENTOR:
BY
ATTORNEYS.

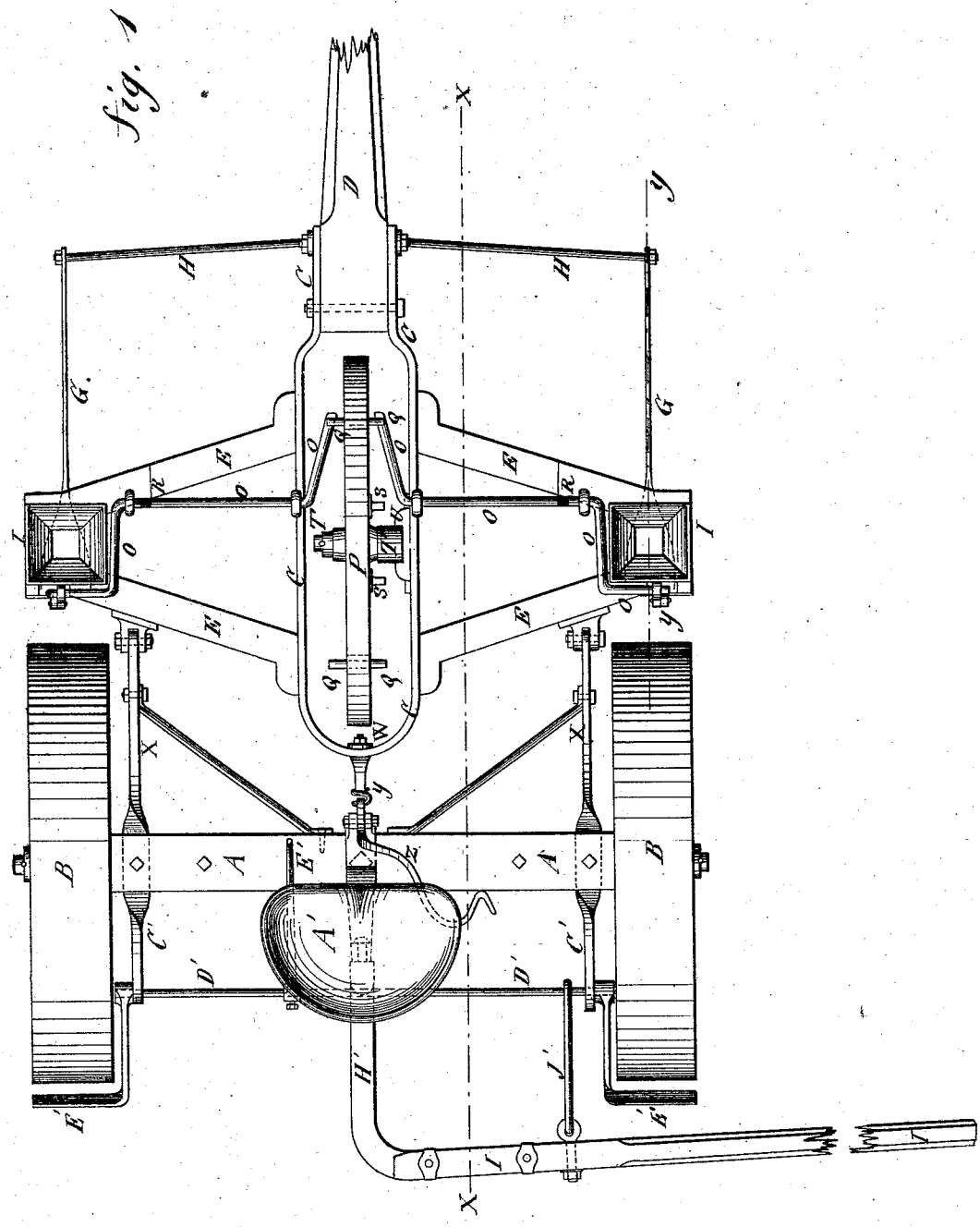

UNITED STATES PATENT OFFICE.

JAMES R. BALL, JOHN S. BALL, AND JOHN G. MOLE, OF XENIA, NEBRASKA.

IMPROVEMENT IN CORN-PLANTERS.

Specification forming part of Letters Patent No. 155,484, dated September 29, 1874; application filed June 13, 1874.

*To all whom it may concern:*

Be it known that we, JAMES R. BALL, JOHN S. BALL, and JOHN G. MOLE, of Xenia, in the county of Sarpy and State of Nebraska, have invented a new and useful Improvement in Corn-Planter, of which the following is a specification:

Figure 1, Sheet 1, is a top view of our improved corn-planter. Fig. 2, Sheet 2, is a vertical longitudinal section of the same, taken through the line $x\,x$, Fig. 1. Fig. 3, Sheet 2, is a detail vertical section taken through the line $y\,y$, Fig. 1.

Similar letters of reference indicate corresponding parts.

The invention consists in the construction and arrangement of parts, as hereinafter described, and specifically indicated in the claim.

A is the axle, upon the journals of which the wheels B revolve. The rims of the wheels B are made wide to prevent them from sinking into the ground, and to enable them to act as rollers to cover the seed. C is a U-shaped bar placed with its bend directly in front of and at a little distance from the center of the axle A. The ends of the bar C are bolted to the opposite sides of the rear end of the tongue D. To the sides of the U-bar C are secured the inner ends of the bars E, the outer ends of which incline toward each other, and to and between said ends are secured the upper ends of the standards F, which are made hollow, and the lower ends of which are made V-shaped to fit into the forked rear ends of the openers G, to which they are attached. The openers G are made runner-shaped, and their forward ends are attached to the outer ends of the bars H, the inner ends of which are secured to the rear end of the tongue D. I are the seed-hoppers, which are attached to the upper ends of the standards F, and which open into the cavity of said standards. J is a plate, which is placed in the cavity of the standards F, and the upper end of which is bolted to the middle part of the said standards at the forward side of said cavity. The lower part of the plate J curves rearward, and to the upper part of its forward side is hinged the upper end of the plate K, the lower end of which is bent back at an angle, passes beneath the lower end of the plate J, and rests against the forward or inner side of the dropping-slide, against which it is held by the spring L. The device J K L thus forms a cut-off to prevent any more seed being carried out by the dropping-slide than enough to fill its dropping cavity. The dropping-slide M moves up and down in a recess in the rear side of the standards F, and has a cavity formed in it to receive the seed from the upper part of the cavity of the standards F, carry it down past the cut-off J K L, and allow it to drop through the lower part of said standards to the ground. The cavity of the dropping-slide M is made in the form of a slot, and its size is regulated as required by a small block, $m'$, placed in it, and secured by a bolt, so that it may be raised and lowered, as required. The dropping-slides M are kept in place by plates N bolted to the rear sides of the standards F, and the upper part of which is slotted to receive the screw that holds the adjusting-block of the dropping-slide in place. Upon the upper end of the dropping-slide M is formed an eye to receive the end of the lever O, by which it is operated. The levers O pass inward along the rear sides of the hoppers I, are bent at right angles, pass forward along the inner sides of the said hoppers, are bent inward at right angles, pass through bearings attached to the frame-work C E, and are bent forward at about a right angle to pass along the opposite sides of the forward part of the center or dropping wheel P, so as to be struck by blocks Q, attached in proper position to the spokes of the said wheel, and operated to raise the dropping-slides M. The levers O, when released from the blocks Q, are brought back to their former position by the weight of the dropping-slides M, and by springs R coiled around said levers O, and attached to the forward bar E. To the rim of the wheel P are attached blocks S, in such positions as to mark the ground in line with the hills, so as to indicate the cross-rows, and thus enable the planting to be done in check-row. The center dropping-wheel P is placed within the U-bar C, and revolves upon an axle-arm, T, the shank of which is bent downward at right angles, fits into a groove in a block, U, bolted to the bar C, and is slotted longitudinally to receive the bolt V, by which it is secured to the guide-block U and bar C. This enables the wheel P to be raised and lowered to cause the openers G to open the ground to a greater or less depth, as may be required.

To the bend of the U-bar C is attached a scraper, W, to remove any soil that might adhere to the rim of the wheel P. The rear bars E' are hinged to the forward ends of the bars or arms X, which are ridigly attached to the axle A. To the bend of the U-bar C, or to an arm attached to said bar, is pivoted the lower end of the connecting-rod Y, the upper end of which is pivoted to the end of the short arm of the lever Z, which is pivoted to a support attached to the middle part of the axle A, and the long arm of which projects into such a position that it may be conveniently reached and operated to raise the planting mechanism from the ground by the driver from his seat A'. The driver's seat A' is attached to the upper end of a standard, B', the lower end of which is attached to the middle part of the axle A. To the axle A are attached rearwardly-projecting arms or bars C', which may be rearward extensions of the arms X, and in the rear ends of which works the shaft D', the end parts of which are bent to the rearward at right angles, or have rearwardly-projecting arms attached to them, upon the ends of which are formed, or to them are attached, scrapers E', which project across the rims of the wheels B, to scrape off any soil that may adhere to them. To the shaft D' is rigidly attached a lever, F', which projects forward into such a position that it may be operated by the driver with his foot, to raise the scrapers E' into working position when required for use, and allow them to drop away from the wheels B when not needed. G' is a stop attached to the axle A, in such a position as to catch upon the lever F' and support the scrapers E', and at the same time prevent them from dropping too low. To the middle part of the rear side of the axle A, or to a support attached to said axle A, is swiveled the end of a bar, H', the outer end of which is bent to one side, and to it is attached the inner end of a bar, I', which projects at right angles with the bar H', or parallel with the axle A, and which is made of such a length that its outer end may reach to the row of hills last planted, to enable the machine to be guided parallel with said row. To the bar I', near its inner end, is swiveled a hook, J', which hooks over the shaft D', to sustain the draft strain upon the marker H' I'. This construction enables the marker to be turned to either side of the machine, as may be required. The lower part of the center wheel P is incased with a sheet-metal fender, K', to prevent old corn-stalks and other rubbish from getting into it and interfering with its operation. The fender K' is attached to the tongue D and U-bar C, and projects down nearly to the ground. To the forward sides of the standards F should be attached pointers, which are not shown in the drawings, and which should be made of such a length as to point to the track of the center wheel.

In using the machine the operator can begin where he chooses, and after passing through he turns and drives up until the pointer upon the standards F points to the marks made by the blocks S. The center wheel is then turned until the blocks Q touch the levers O. The operating part of the machine may then be dropped to the ground, and it is ready for planting. If any unevenness of the ground should cause the wheel to vary, it can be immediately detected and easily reset.

Having thus described our invention, we do not claim, broadly, a marking-bar pivoted or swiveled to the frame of a planter.

We claim as new and desire to secure by Letters Patent—

1. The combination of the pivoted marking-bar I' and the curved supporting-bar H', projecting in rear of the seat and swiveled to the frame, as shown and described, whereby the marker may be folded alongside the seat across the axle and frame, when not in use.

2. The combination of the tappet-wheel P Q, the levers O, bent at a right angle at each end, and the vertically-reciprocating seed-slides, all as shown and described, to operate as specified.

3. The curved plate J, fixed in the cavity of standard F, the hinged and curved cut-off K, and spring L, in combination with the vertically-reciprocating dropping-slide M, a recess for reception of seed, all as shown and described, to operate as specified.

JAMES R. BALL.
JOHN S. BALL.
JOHN G. MOLE.

Witnesses:
ALVIN BALL,
JAMES STOCKTON.